Figure 1:
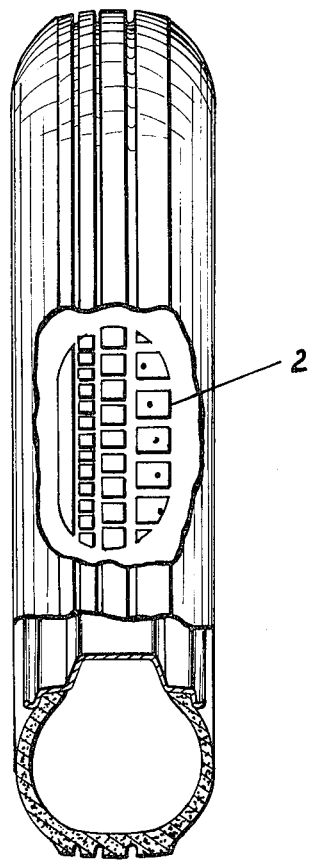

Nov. 16, 1965　　W. ELLENRIEDER ETAL　　3,217,776
ANTI-SKID AUTOMOBILE TIRE
Filed Feb. 25, 1964　　　　　　　　　　2 Sheets-Sheet 2

INVENTORS
WILLY ELLENRIEDER
RUDOLF HENNECKE
BY Dicke & Craig
ATTORNEYS

United States Patent Office 3,217,776
Patented Nov. 16, 1965

3,217,776
ANTI-SKID AUTOMOBILE TIRE
Willy Ellenrieder, Holderlinweg 78, Esslingen (Neckar), Germany, and Rudolf Hennecke, Hohenstanstrasse 22, Ebersbach (Fils), Germany
Filed Feb. 25, 1964, Ser. No. 347,223
Claims priority, application Germany, Mar. 2, 1963, E 24,420
17 Claims. (Cl. 152—210)

The present invention relates to an anti-skid tire for automobiles which complies as much as possible with all requirements which are made upon a tire under any possible weather and road conditions and it is the main object of the invention to provide a tire which is suitable primarily for driving on dry roads but permits safe driving especially in curves also on wet roads, on loose, packed, or ice-coated snow or in sludge, or even on ice.

A further object of the invention is to provide a tire with spikes which complies with the above-mentioned conditions. Such spikes dig into the snow and ice and thereby reduce considerably the danger of slipping of the tire in the peripheral direction on the road when starting or accelerating the vehicle or applying its brakes, and also in transverse directions, especially when taking curves. Such a spike-equipped tire has, however, the disadvantage that on a dry or merely wet road it will skid more than a tire without spikes and that the road surface may also be harmed by the spikes.

While when driving a car in a straight direction the outer, central and inner parts of the tread of a tire are subjected to substantially uniform stresses and the wear thereon is therefore also substantially uniform, the conditions change radically when the car is taking a curve since one or the other shoulder of the tire has then to bear the greatest stresses and will therefore be especially worn. If, for example, a passenger car of a conventional type is taking a sharp left curve on a dry road, the pull toward the right caused by the centrifugal force exerts upon the right sides of the treads of all four tires a greater load than upon those on the left, and a considerably greater load upon the right tread sides of the right front and rear tires than upon those of the two left tires since the resultant of the gravity and the centrifugal force extends downwardly toward the right. When taking a sharp right curve, the reverse takes place and the left sides of the treads of the two left tires are subjected to the greatest load.

The general result of this is that always that shoulder of the tire which is subjected to the greatest load, that is, generally the outer shoulder of the tire facing the outer side of the curve, is worn to a greater extent than the central and inner parts of the tread. Therefore, the tires on all vehicles with two or more tracks when driven on changing roads with straight and curvy stretches are worn very unevenly. This uneven wear upon the tread of the tire also prevents the rubber and the spikes on the tread from being equally worn.

Consequently, when the spikes are provided on both sides of the center of the tire tread, the wear upon the rubber will be much greater on the more highly loaded side than on the other so that the spikes which should not project more than 1.5 to 2 mm. from the rubber will project more and more and will thus endanger the road surface. In addition, the tire will be affected by the temperature which may become so high on the surface of the spikes at the more highly loaded side of the tire that the rubber may lose its holding strength and the spikes may be torn out of the rubber.

It is, therefore, another object of the invention to provide such an arrangement of the spikes, especially in combination with the novel design and structure of the tire tread, that the above-mentioned disadvantages will be overcome.

An important feature of the invention therefore consists in providing the spikes only on one of the two sides of the tread between its zenith line and the respective lateral edge of the tread. On which side of the tread the spikes should be provided depends upon the kinematics of the particular wheel suspension of the vehicle, although in any event no spikes should be provided on that tread side of the four sides of the two front or rear wheels which is subjected to the greatest load when taking sharp curves on a dry road. The tires according to the invention should therefore be mounted, for example, in such a manner that the tread sides which are equipped with spikes face toward the inside of the vehicle.

The result is then attained that, when driving in sharp curves on a dry road, the spikes are subjected to substantially no loads and cannot cause any undesirable effect, such as skidding on the road or damaging of its surface. When driving on snow, however, the spikes will become operative even in curves since, due to the lower speed at which a car is then driven and due to the lower coefficient of friction between the tires and the road and the smaller lateral displacement of the cross-sectional shape of the tire, the load on one side of the tread surface will then be much lower than when taking sharp curves on a dry road.

A further object of the invention is to provide a tire which has a rib extending continuously in the peripheral direction adjacent to the edge of one lateral side of the tread surface, while the peripheral surface of the remainder of the tread is interrupted so as to form a series of individual calks which are separated by grooves. Such a continuous rib has the purpose of improving the ability of the tire to brace itself against skidding laterally toward the outer side of a curve and it is therefore provided on that side of the tread surface of a tire which is subjected to the greatest load when driving along a curve, that is, in the example mentioned above, on the outer side of the tread of each tire. Consequently, each tire according to the invention should be equipped with spikes on that side of its tread surface which is opposite to the side carrying the continuous rib.

Another feature of the invention consists in mounting the spikes in a staggered relation to each other as seen in the peripheral direction of the tire tread and/or as seen in the transverse direction if several adjacent rows of spikes are provided. This feature has the advantage that none of the spikes can possibly skid within the path of movement of another spike.

The spikes should, however, not be offset to such en extent relative to each other that, when the tire is skidding, the tracks formed by the spikes will be separated by gaps. If this were true as it was of the tires of the types which were previously used, it would mean that the rubber surfaces between the spikes would come in contact with the road and that the spikes would therefore be ineffective. According to the invention there is therefore such a number of spikes provided within the respective elliptical contact area of the tread on the road and these spikes are offset relative to each other in such a manner in the transverse direction of the tire that the distance between parallel lines passing in the peripheral direction through successive spikes will not be larger than the diameter of a spike. If, therefore, the tire should start to slide, for example, when applying the brakes on an icy or slick snow-covered road, the entire group of spikes within the respective elliptical contact area of the tread on the road will leave an uninterrupted track on the road in the direction in which the car is driven, and this track then has a width equal to the entire width between the outermost and innermost spikes. The ice or packed snow on the road will therefore be scraped out by the spikes without a gap in accordance with the width of this track and the tire will thus be prevented as much as possible from skidding laterally.

A further object of the invention is to design and contruct a spike-equipped tire of the type as described in such a manner that the rubber calks of the tread and the spikes therein will be worn as uniformly as possible so as to insure that the tire will remain safe in operation for the longest possible time.

For attaining this object, the spikes are preferably provided on one side of the tread but only within an area which is spaced at a certain distance from the central zenith line of the tread surface. This is an important feature of the invention since the central part of the tire in front of and behind the elliptical contact surface of the tread on the road is subjected to the greatest changes in shape and stresses, and these stresses would be further increased by the mass action of the spikes and especially their centrifugal force if they were provided within the central area of the tread which might lead to a destruction of the tread and even of the entire tire casing.

By the inventive arrangement of the spikes only at one side of the center of the tread and especially by the combination of this arrangement with the unsymmetrical tread pattern it is possible to control the relation between the wear upon the rubber and upon the spikes so that the wear upon the spikes will be substantially equal to that upon the rubber.

The interrupted pattern of the tread has the further advantage that the tire will always have the required grip on a wet road, on snow and in sludge. Since the tread pattern is open toward three sides, the water through which the tire is driven will be forced out of the grooves in the tread toward the outside, while snow and sludge may pass from the transverse grooves into the longitudinal grooves. It has further been found to be of considerable advantage if the division of the tread pattern into calks and intermediate grooves becomes increasingly coarse from the continuous rib at one side of the tread toward the opposite side which carries the spikes.

By making this continuous rib of a considerable width and the calks of the adjacent row at the same side of the tread of a relatively small size and spaced by narrow grooves from each other, the advantage is attained that the wear upon the tire will be considerably reduced and the length of its service will be accordingly increased. The so-called polygonal wear which occurs primarily on the tires of non-driven wheels is also eliminated almost entirely.

The unsymmetrical tread pattern in combination with the unsymmetrical arrangement of the spikes also results in a considerable reduction of the noise which is made by the usual winter tires on a road and especially by those tires which are equipped with spikes in the usual arrangements. This is true primarily when driving along a straight road but also when driving along curves either on a dry or wet road.

Figure 2:
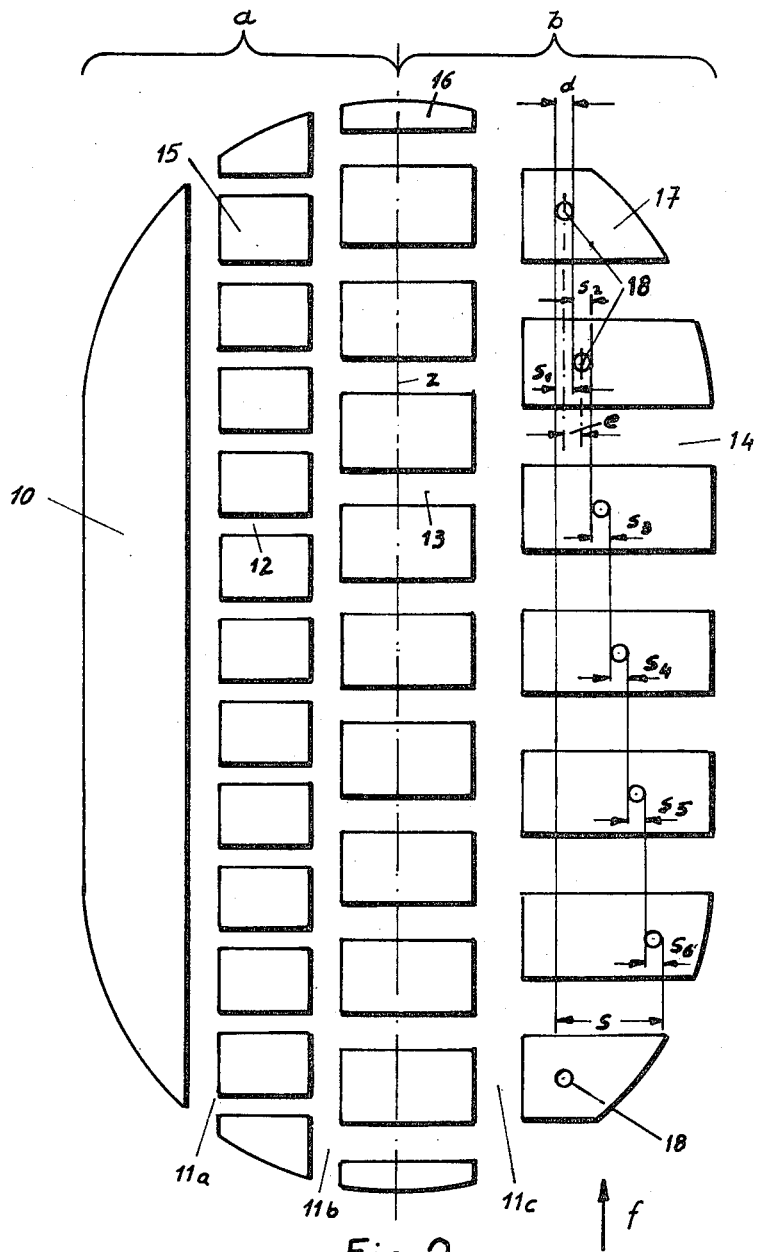

The features and advantages of the present invention will become more clearly apparent from the following description thereof which is to be read with reference to the accompanying drawings, in which:

FIGURE 1 shows, partly in section, a general view of the tire according to the invention; while FIGURE 2 shows a plan view of a part of FIGURE 1, namely, of the part of the tread of the tire which is indicated at 2 in FIGURE 1 and forms a so-called elliptical contact surface of the tread.

The tread of the tire according to the invention as illustrated in the drawings has a zenith line $z$ which is disposed within the central plane of the tire and separates the two sides $a$ and $b$ of the tread. The pattern of the tread is unsymmetrical and formed by a continuous rib 10 on one shoulder of the tire which is usually located on the outside of the wheel on which the tire is mounted, while the remainder of the tread is divided by continuous grooves 11$a$, $b$ and $c$ extending in the peripheral direction and by several series of transverse grooves 12, 13 and 14 of such a length and width that the intermediate calks 15, 16 and 17 forming peripherally extending rows increase in volume from the continuous rib 10 toward the opposite tire shoulder, preferably by increasing in width and also in length, while the transverse grooves 12, 13 and 14 between the calks of each row preferably also increase in width in the same direction.

As further illustrated in the drawings, only one of the two sides of the tread, namely the side $b$ opposite to the side carrying the continuous rib 10, is provided with spikes 18 which are mounted, for example, only in the calks 17. These spikes are staggered relative to each other in the peripheral direction and also in the transverse direction of the tire so that the distance $e$ between successive spikes as seen in the transverse direction of the tire substantially corresponds to the diameter $d$ of each spike. Consequently, if the tire slides along the road in the direction $f$ in which the car is driven, the spokes 18 within the area of the elliptical contact surface 2 will leave continuous tracks $S_1$, $S_2$, $S_3$, $S_4$, $S_5$, and $S_6$, as indicated in FIGURE 2 by hatched lines which together form a single track of the width S without any intervening gaps.

According to the particular embodiment of the invention as illustrated, each of these calks 17 of this lateral row carries only a single spike 18, and these spikes are equally staggered in succession relative to each other and preferably in a manner so that the first and last spikes within each elliptical contact area lie within a line which extends substantially parallel to the zenith line $z$ and form the first spikes of successive groups each of which is disposed within a straight line which is inclined to the zenith line $z$. Instead of arranging the successive spikes within each of these groups so as to be equally staggered relative to each other so that each group is disposed within a straight inclined line, it is, however, also possible to stagger them in any other order within the area of the full track $s$ which is left by all of them, for example, in the order so as to leave successively the individual tracks $S_1$, $S_3$, $S_5$, $S_2$, $S_4$, $S_6$.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. An anti-skid automobile tire having a zenith line, comprising tread means including two tread portions,
    said tread portions being disposed on opposite sides of the peripheral tire zenith line,
    and spike means including a plurality of spikes within said tread means and disposed within only one of said tread portions in an area thereof contacting the road surface during normal use.

2. An anti-skid automobile tire as defined in claim 1, in which said spikes are disposed in a staggered relation to each other as seen in the transverse direction of the tire.

3. An anti-skid automobile tire as defined in claim 2, in which said spikes are also disposed in a staggered relation to each other as seen in the peripheral direction of the tire.

4. An anti-skid automobile tire having a zenith line, comprising tread means including two tread portions,
    said tread portions being disposed on opposite sides of the peripheral tire zenith line,
    and spike means disposed within only one of said tread portions in an area thereof contacting the road surface during normal use including a plurality of spikes, the other tread portion being provided with a continuous peripheral tread rib adjacent the outer edge thereof, while the remainder of the tread means forms an interrupted pattern extending in the peripheral direction of the tire.

5. An anti-skid automobile tire having a zenith line, comprising tread means including two tread portions,
   said tread portions being disposed on opposite sides of the peripheral tire zenith line,
   and spike means on said tread means disposed within only one of said tread portions including a plurality of spikes disposed within a substantially elliptical contact area, said spikes being offset relative to each other within said area in the transverse direction of the tire in such a manner that the distance between parallel peripheral lines passing through successive spikes substantially corresponds at the most to the diameter of a spike.

6. An anti-skid automobile tire as defined in claim 5, in which said distance between said parallel peripheral lines passing through successive spikes is not greater than the diameter of a spike.

7. An anti-skid automobile tire as defined in claim 5, in which said tread is divided by peripheral and transverse grooves so as to form a plurality of calks, said calks adjacent to one lateral edge of one of said sides of said tread forming a peripheral row, and one of said spikes being mounted in each calk of said row.

8. An anti-skid automobile tire as defined in claim 5, in which said spikes are offset relative to each other in the transverse direction of said tire so that all of said spikes disposed within one elliptical contact area of said tread means will in association with each other leave an uninterrupted track.

9. An anti-skid automobile tire as defined in claim 8, in which said spikes within each elliptical contact area are disposed so that the first and last spikes within said area lie substantially within the same peripheral line extending parallel to the zenith line of said tread.

10. An anti-skid automobile tire having a zenith line, comprising tread means including two tread portions,
    said tread portions being disposed on opposite sides of the peripheral tire zenith line,
    and spike means disposed within only one of said tread portions including a plurality of spikes,
    and a plurality of calks in said tread means formed by peripheral and transverse grooves provided therein, said calks increasing in volume in the transverse direction of said tread means from the one shoulder at the lateral side of said tread means opposite the side containing said spikes toward the side containing said spikes.

11. An anti-skid automobile tire having a zenith line, comprising tread means including two tread portions,
    said tread portions being disposed on opposite sides of the peripheral tire zenith line,
    and spike means disposed within only one of said tread portions including a plurality of spikes disposed within a substantially elliptical contact area, said spikes being offset relative to each other within said area in the transverse direction of the tire in such a manner that the distance between any two successive parallel peripheral lines passing through two spikes offset in a transverse direction substantially corresponds at the most to the diameter of a spike.

12. An anti-skid automobile tire according to claim 11, in which the distance between successive parallel peripheral lines is equal to the diameter of a spike.

13. An anti-skid automobile tire according to claim 11, in which said spikes are offset relative to each other in the transverse direction of said tire so that all of said spikes disposed within one elliptical contact area of said tread means will in association with each other leave an uninterrupted track.

14. An anti-skid automobile tire having a zenith line, comprising tread means including two tread portions,
    said tread portions being disposed on opposite sides of the peripheral tire zenith line,
    and spike means disposed within only one of said tread portions including a plurality of spikes disposed within a substantially elliptical contact area, said spikes being offset relative to each other within said area in the transverse direction of the tire in such a manner that the distance between two adjacent parallel peripheral lines passing through spikes substantially corresponds to the diameter of a spike,
    and a plurality of calks in said tread means formed by peripheral and transverse grooves provided therein, said calks increasing in volume in the transverse direction of said tread means from the one shoulder at the lateral side of said tread means opposite the side containing said spikes toward the side containing said spikes.

15. An anti-skid tire having a zenith line, comprising tread means including two tread portions,
    said tread portions being disposed on opposite sides of the peripheral tire zenith line,
    and spike means disposed within only one of said tread portions including a plurality of spikes arranged exclusively within a zone of said one tread portion located at a substantial distance from said zenith line,
    said spikes being disposed in said zone within a substantially elliptical contact area and being offset relative to each other within said area in the transverse direction of the tire in such a manner that the distance between adjacent parallel peripheral lines passing through said spikes substantially corresponds to the diameter of a spike.

16. An anti-skid automobile tire according to claim 15, wherein said spike means includes a plurality of spikes disposed within a substantially elliptical contact area, said spikes being offset relative to each other within said area in the transverse direction of the tire in such a manner that the distance between adjacent parallel peripheral lines passing through said spikes at the most substantially corresponds to the diameter of a spike.

17. An anti-skid automobile tire according to claim 16 in which said spikes are offset relative to each other in the transverse direction of said tire so that all of said spikes disposed within one elliptical contact area of said tread means will in association with each other leave in uninterrupted track.

References Cited by the Examiner
UNITED STATES PATENTS

| 2,467,418 | 4/1949 | Alexiadis | 152—210 |
| 2,534,869 | 12/1950 | Jones | 152—209 |
| 2,888,057 | 5/1959 | Hildebrant | 152—210 |
| 3,155,135 | 11/1964 | Klenk | 152—209 |

ARTHUR L. LA POINT, *Primary Examiner.*